METHOD FOR MANUFACTURING EXTENDED TAB CORE MEMORY FRAMES

Filed Dec. 28, 1965

INVENTORS
CARL T. CRAWFORD
WILLIAM W. EVERLING

BY Joseph A. Speldrich
AGENT

United States Patent Office 3,382,572
Patented May 14, 1968

3,382,572
METHOD FOR MANUFACTURING EXTENDED TAB CORE MEMORY FRAMES

Carl T. Crawford, Bloomington, and William W. Everling, St. Paul, Minn. (both of Univac Park, St. Paul, Minn. 55116)

Filed Dec. 28, 1965, Ser. No. 517,019
9 Claims. (Cl. 29—604)

ABSTRACT OF THE DISCLOSURE

A method of manufacturing a memory frame having conductive extended terminal tabs for electrical connection thereto including forming an insulative spacer member, laminating the spacer member to a conductive sheet member that extends over the edges of the spacer member and then forming the extended terminal tabs from the sheet members.

Information storage or memory matrices are utilized in electronic digital computer devices. Such matrices comprise a series of very small ferromagnetic toroidal cores arranged in a configuration having wires running through their central aperture in at least two directions normal to each other constituting, respectively, the so-called X and Y axis of the matrix, which wires pass through the cores of each column, with the wires being secured at each end to corresponding terminals provided on an insulating frame surrounding the matrix.

A current trend in memory systems utilizes the principle of subdivision of the memory into several small systems of planes. These matrix planes are then individually wired and stacked one above the other. Completion of the memory system involves interconnection of these stacked planes and external connection to the remainder of the computer systems. The ends of the wires threading the cores are individually soldered or otherwise secured to the flat terminals on the frame member. To provide the interconnection between respective memory matrices in a stacked assembly, small individual connector or contact elements are disposed between the conductive terminal strips on each of the respective memory matrices, one for each matching pair of terminal strips.

Basically, the individual matrix planes must provide the function of a housing and support for the cores and secondly they must provide for electrical termination and itnerconnection of the inter-plane and intra-plane circuits.

Accordingly, the backbone of most systems is the memory matrix frame which is an open-centered square or rectangular unit. The open-centered area of the frame is used as a core housing by providing clearance for the cores that are supported by the wire matrix.

One type of memory-frame is a machined glass-epoxy-laminate frame which is used in coincident current systems. Another type of frame is a molded frame that consists of a frame with molded-in contacts. The molded-in variety of contacts extend beyond the memory array frame in an extended cantilever tab fashion wherein the tabs are bent to make contact with each other and thus interconnect one memory frame with another. A subsequent operation of this type of frame is a gang soldering of an entire edge of the frame by dip- or flow-soldering techniques. This advantage is one that makes the assembly of individual frames of this type economical for large-volume production. Interconnection of circuits when stacking this type of frame is accomplished, for example, by bending the extending tabs towards each other from adjacent frames and permanently connecting them by soldering, welding, or thermo-compression bonding techniques. Other types of interconnections between memory frames are accommodate by short external contact tabs that are designed to accomplish jumpered inter-plane connections through the use of individual wires or sheet-metal jumper clips. This must be accomplished on an individual hand-operation basis which is difficult, expensive, and time-consuming. Another type of contact utilized on the molded frame is that in which there are assembled-in contacts that provide solderless inter-plane connections. Several different types of interconnection can be provided with various contact configurations including wire-to-wire contacts, jumper contacts, printed circuit contacts, signal male contacts and female contacts, and the like.

The disadvantages of using individual connective elements accrue from the fact that the connective elements represent a highly expensive type of inter-plane connection. Another disadvantage is a relatively high tooling cost and long lead time necessary for production of a new frame and contacts. Another disadvantage of the prior art techniques which used the assembled-in contacts is evidenced by the fact that it is difficult to maintain proper contact between each of the memory planes. For example, bending, misshaping and deforming of the interconnection contacts may provide improper connections between the memory plane matrices which would be detrimental to the performance of the memory stack. Also, oxide formations on the memory plane terminals and on the contacts thereof interfere with proper electrical interconnections.

Accordingly, the present invention is intended to overcome the prior art deficiencies by the use of a molded epoxy-glass spacer frame, or a frame consisting of other suitable material, mounting conductive terminal portions formed by printed circuit techniques. Advantages of this type of frame include the simplicity of components and a short tooling time for production of the bare frame. Additionally, this particular type of frame represents a reliable design for interconnecting individual memory planes with each other in the stack without the attendant deficiencies of prior art construction. The use of a double-sided copper-clad glass-epoxy laminate, for example, etched to provide conductive terminal leads that extend in a cantilever type fashion beyond the spacer frame provides the extended terminal tabs for subsequent mechanical and electrical juncture accommodations external to the stacked array.

Accordingly, it is an object of the present invention to mitigate the disadvantages of the prior art and to provide a core memory plane fabrication method for producing memory planes which are economical, compact, and reliable.

Another object of the present invention is to provide a method of fabricating a core memory plane by a printed circuit process.

An additional object of the present invention is to provide a method of fabricating a core memory plane containing extended tabs for inter-plane connections.

It is a still further object of the present invention to provide a method for manufacturing a core memory core plane of the kind set forth in which the insulating frame is adapted to receive printed circuit extended tab memory terminals wherein the extended tabs are bent to provide electrical or mechanical juncture between superimposed memory planes.

It is a yet further object of the present invention to provide a method for manufacturing a core memory plane of the kind set forth in which the memory plane is divided into a composite assembly consisting of an insulating frame member accommodated with extended tab portions formed thereon, the frame member having recesses for locating and securing in spaced relation a plurality of terminals with integral ferrules of tubular or substantially toroidal form in which the ends of the core wires are located and secured to the terminal portions.

In accordance with the method for manufacturing memory core matrices of the kind set forth, the steps comprising the invention include basically the following: fabricating an insulating frame spacer member into predetermined size dimensions to contain a recessed central portion for accommodating magnetic cores; adhesively bonding to opposed planar surfaces of the spacer member conductive sheet members of larger size than the spacer member to provide an overhang; laminating the conductive members to the insulating frame; and, providing said insulating spacer member with conductive and extended terminal tabs by photo-etching techniques to remove selected portions of the conductive sheet members to form extended tab terminals.

These and other more detailed objects of the invention will be by way of example with reference to the accompanying diagrammatic drawings, more evident by referring to the specification and drawings in which.

Figure 1:
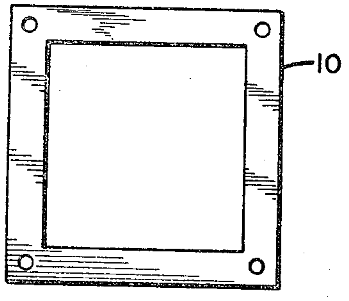
FIG. 1 is a top view of the insulation spacer member.
Figure 2:
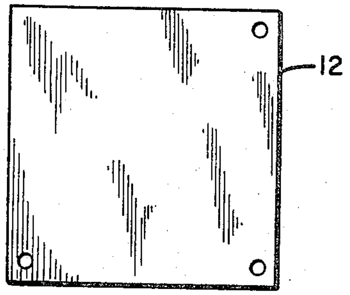
FIG. 2 is a top view of a conductive sheet member.

The objects of the present invention are carried out in accordance with a fabrication process described in the following. Initially, an epoxy-glass spacer member 10 of shear stock is fabricated to the desired size by a suitable fabrication process which may include shearing, machining, and the like, the outside dimensions to form a rectangular or other desired configuration. Subsequently, the rectangular spacer member is blanked or otherwise fabricated to provide an open area internally for the purposes to be described below. A blanking operation may consist of a stamping operation by which the internal opening is created. After removal of the blanked portions, the spacer member is degreased, if necessary, in a suitable degreasing solution by spraying, washing or other suitable techniques. A suitable degreasing technique may be accomplished by vapor degreasing with an organic solvent such as trichloroethylene, by immersion in an organic solvent such as carbon tetrachloride, or by washing the board with a detergent or emulsion cleaner. Alignment holes are formed in the four corners of the rectangular spacer member for alignment purposes in a stacked assembly of memory frames as will become evident in the ensuing description. It is to be noted that the material forming the base spacer member is not intended to be limited to an epoxy-glass material, but rather any suitable insulating material which exhibits the required strength and insulating characteristics may be utilized.

The next step of the manufacturing process consists of machining or otherwise fabricating conductive blanks or sheet members 12 to a desired size. The geometrical configuration of the conductive sheet member corresponds generally to that of the spacer member but is of larger planar dimensions such that when disposed on the spacer member will overhang the edges thereof for a certain distance. A preferred material for the sheet members is copper because of its strength and electrical conductivity characteristics as well as its susceptibility to photo-etching techniques. However, no intention is made to limit the sheet members to copper inasmuch as a variety of conductive materials such as aluminum, for example, would be suitable. One planar surface of the sheet members has been treated with an oxide to enhance bonding qualities as will be described below. Holes are then formed, such as by drilling for example, in a plurality of corners of the sheet members. In order to reduce fabrication time, a stack of sheet members may be placed one on top of the other with the oxide surface mating with the oxide surface of an adjacent copper sheet member. The copper sheet members are fabricated to a required size such that the final resulting physical configuration is such that when disposed on the spacer member it overhangs a predetermined distance over all edges. Next, a suitable adhesive coating is applied to the oxide treated surface of the sheet members. Any suitable type of adhesive coating treatment may be utilized which will provide requisite bonding characteristics. For example, a heat curable adhesive of the type that may be subsequently cured by the application of both heat and pressure or by heat alone may be utilized. The strength of the adhesive bond is enhanced by the aforementioned treatment providing a film of oxide on the surface of the conductive sheet member to be bonded. Subsequent to the coating process, the coat treated sheet members are air dried and heated such as by a baking process to enhance escapement of volatile material from the adhesive and of volatile material from the spacer member. Subsequent to the coating process, the coat treated sheet members are air dried and heated such as by a baking process. A suitable temperature has been found to be 105°+5° F. for approximately thirty minutes. Subsequent to the heating process, a copper sheet member, the spacer member, and another copper sheet member are assembled to form a three piece composite assembly. It is to be noted the sheet member treated side is registered in the composite assembly so that the treated side of the sheet members mate with the spacer member. In a two piece assembly, the sheet member similarly mates with the spacer member.

Figure 3:
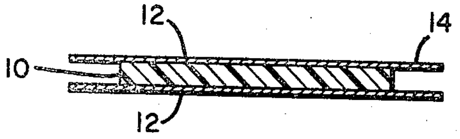
FIG. 3 is an end view illustrating a laminated composite assembly consisting of two conductive sheet members of FIG. 2 separated by the spacer member of FIG. 1.

After the conductive sheet members have been assembled on either side of the spacer member to provide an assembly as illustrated in FIG. 3, the assembly is laminated in order to secure the sheet members to the spacer member thereby curing the adhesive. A suitable heat and pressure application for a desired time provides the laminating technique. The temperature, pressure, and time interval utilized during the lamination process are set at values in accordance with those conditions that provide the desired laminated assembly. After lamination, the assembly is heated such as by baking, which baking is a post-curing process. The composite laminated assembly, consisting of the spacer member and conductive sheet members laminated to it on either side thereof, is such that only the areas of the sheet members that have been coated with adhesive are bonded to the spacer member. The overhangs 14 extending from each side of the spacer member represent cantilevered projections and are not bonded to each other. The purpose of utilizing an oxide treatment on the conductive sheet members is to improve bonding characteristics of the sheet members to the spacer member, the adhesive coating and oxide layer forming a desired combination of materials to improve and ensure reliable bonding of the conductive sheet members to the spacer member during the laminating process.

The next successive stages of processing represent cleaning activities for the conductive sheet members. Initially in this processing stage, the assembly is subjected to a suitable cleansing solution which may, for example, be a solution containing 20% hydrochloric acid, then water rinsed, subjected to an anti-tarnish solution and finally a drying process, such as baking, for example. The anti-tarnish solution is used in order to preclude formation of oxide on the conductive sheet members.

Figure 4:
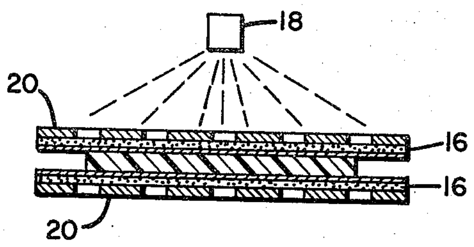
FIG. 4 illustrates the printed circuit fabrication technique for forming the extended tab terminals.

The next process step consists of applying a suitable photo-sensitive resist material 16 such as Kodak-Photo Resist marketed by Eastman Kodak, to the external exposed planar surface of each of the conductive sheet members as illustrated in FIG. 4. The photo-resist material may be applied by a dipping process or a spraying process or any suitable process in accordance with that technique that will apply a uniform coating over the entire sheet member. Then the photo-sensitive resist material proceeds through a print operation which consists of exposing selected areas of the photo-resist coated sheet members to a suitable light source 18, such as ultraviolet, through a mask or pattern 20 corresponding to the desired circuits to be printed as illustrated in FIG. 4. The particular photo-sensitive resist material utilized is that which becomes light hardened, that is polymerized, in those areas that have been exposed to the aforementioned light source through the mask element. That is, where the resist coating is exposed to light, it is hardened and thus rendered relatively insoluble in various solvents that otherwise would readily dissolve the coating. Although only a single light source has been illustrated in the figure for simplicity, it is obvious that in order to reduce processing time, simultaneous exposure of the coating of the photo-resist material may be accomplished by exposing, with a plurality of sources, both sides of the assembly.

After exposure to light energy the composite memory frame assembly proceeds through a developing process which removes those areas underneath the opaque pattern of the mask that have not been exposed to light energy. The process of developing consists of subjecting the assembly to a suitable developer solution such as Kodak Photo-Resist Developer marketed by Eastman Kodak Company for dissolving away the unexposed photo-resist to selected bare areas of the conductive sheet member. Then the assembly, with the unexposed portions of the photo resist material being removed by the developing process, proceeds through a dyeing process using, for example, Kodak Photo-Resist Dye marketed by Eastman Kodak Company. The photo-resist material that was exposed to the aforementioned light energy has become light hardened and as such has developed an affinity for the particular dye solution being used. The purpose of the dye is that in its affinity to the light hardened resist material it provides a clear visual indication of the pattern that became light hardened to facilitate inspection of pattern resolution. The process may be accomplished, for example, by dipping the assembly by immersion techniques into the dye solution. As a result of the immersion of the exposed surfaces, the underside of the overhangs, as well as the unexposed resist, may undesirably be coated with the dye solution; however, the exposed areas of resist have a greater affinity for the dye. Subsequent to dyeing, the assembly is subjected to a water spray rinsing process for removing dye other than that absorbed into the pattern. Subsequently, the spray rinsed assembly is dried thoroughly such as for example by air drying, oven drying, or the like. A satisfactory time and temperature has been found to be 30 minutes ±5 minutes at 195° ±5° F. It is to be noted that the purpose of the dyeing operation is to permit the dye to be absorbed into the pattern, thus allowing a visual indication of pattern resolution over different areas of the board for inspection purposes. It is to be noted that the under surfaces of the extended sheet members that overhang the spacer member contain the adhesive coating previously applied over the oxide surface. The purpose of the coating is to protect the under surface of the overhanging copper sheet member from forming undesirable deposits, and to resist etching as described below.

Figure 5:
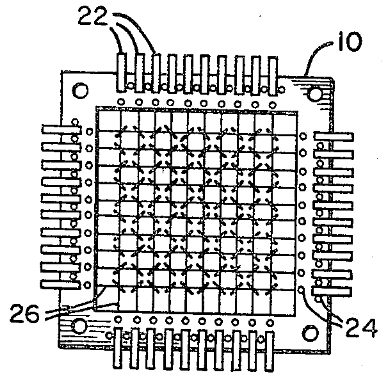
FIG. 5 illustrates a top view of a completed memory array matrix containing thereon extended tab terminal portions together with drive and sense lines.

The next portion of the process consists of an etching operation by which the non-hardened areas, which have not been exposed through the mask to the light energy, are removed by a suitable etchant solution. It is evident that the etchant material affects only those areas of the conductive sheet member from which the photo-resist material has been removed. That is to say, the photo-resist material that has been light hardened resists etching while the etchant attacks the metal, i.e., the sheet member, under the now removed unexposed portions. As illustrated in FIG. 5, the etching operatioin produces from the sheet member a series of conductive terminal tabs 22 that are cantilevered over the edges of the spacer member 10.

After completing the continuous etching process, remaining photo-resist material that was exposed to light energy is removed from the terminal tabs by subjecting them to a stripping solution such as by total immersion of the assembly.

Subsequently, the stripped terminal tabs are water rinsed and brushed in order to remove unwanted materials. Then the assembly is air dried or dried in some other satisfactory manner.

The assembly is then subjected to a drilling process for providing the assembly with a series of holes 24 as illustrated in FIG. 5 through which the ends of the core supporting wires 26 extend for ultimate secured contact with the terminal tabs 22.

Subsequent to the drilling step, the assembly undergoes an adhesive removing process for removing the previously applied and still remaining adhesive. The process is accomplished by subjecting the assembly to a suitable adhesive removal solution consisting, for example, of a diluted sulfuric acid solution, the solution being elevated to a temperature of approximately 150°±10° F. Satisfactory removal time is 25±5 seconds. The assembly is then rinsed with water to remove the remaining loosened adhesive and then degreased with a suitable degreaser solution. As a result, the terminal tabs are completely cleaned of all unwanted materials. The assembly is then dried by baking, for example, at 200°±10° F. for 30 minutes.

It is to be understood that the aforementioned times, pressures, and temperatures are not intended to be limitative in nature. The use of a particular photo-resist, developer, stripper, etc., and the use of a particular process are merely exemplary.

The assembly is then subjected to a coating operation, which may, for example, consist of immersion, plating, or the like. However, prior to the coating operation the assembly proceeds through a cleaning procedure for ensuring the complete removal of the oxide which cleaning procedure may consist of subjecting the assembly to an alkaline cleaning solution, a water rinse, a hydrochloric acid solution containing 15 percent hydrochloric acid, water rinse, to another chemical cleaning operation, water rinse, another 15 percent sulfuric acid solution, and finally to a water rinse, successively. Although a particular procedure of cleansing is described, no intention is made to limit such cleansing strictly thereby. Substitutions as well as deletion of various process steps of cleansing may be accommodated as is suitable. The primary purpose of the cleansing operation is to thoroughly clean the conductive terminal tabs down to the base metal.

Subsequent to cleansing the assembly is subject to the aforementioned coating operation, which may consist of immersion into a solution containing a desired proportional quantity of tin salts. The object of coating is to promote subsequent solderability of the core wires to the terminal tabs as well as to prevent harmful copper oxide formation upon the terminal tabs. No intention is made to limit the coating material to tin. For example, electrolytic or immersion gold, electrolytic tin, and rhodium, to mention a few, would also be satisfactory to accomplish the intended purpose. After coating, the assembly is subject to a water rinse, preferably hot water, and then dried, for example, by an oven drying process. After drying, the previously formed holes may be reamed if needed.

The resultant product derived from the aforementioned fabrication process steps produces a magnetic core memory frame consisting of a spacer member having formed thereon extended tab type conductive terminals projecting beyond the assembly frame edges in a cantilevered fashion. Subsequently, the cores are strung or disposed in the frame window opening on X–Y drive lines with a Z sense line interconnecting all the cores in a serial fashion for coincident current type memories. The X–Y lines are secured to the conductive terminal tabs by a suitable process such as soldering, welding, or thermocompression bonding and the like. Where a linear select memory, also termed a "word organized" memory, is intended, only X–Y wires are strung through the cores, which wires may be termed the common digit-sense line and word line, respectively. Although the particular type of memory application forms no part of the present invention, the above description is intended to indicate that the memory frame produced by the present manufacturing method is not limited to a single system application, but rather may be accommodated in a plurality of applications by proper wiring techniques.

Figure 6:
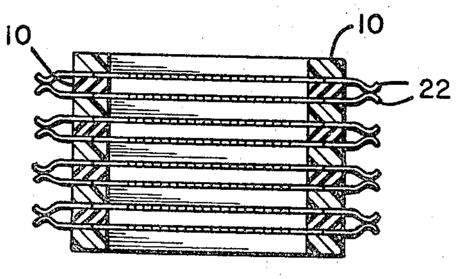
FIG. 6 illustrates a stacked array of memory matrix planes with the extended tabs interconnected to provide electrical and mechanical interplane juncture.

In accordance with common usage in data processing systems, the individual core memory frames are arranged in a stacked relationship as illustrated in FIG. 6. Insulators 10 separate each of the memory frames from each other. The projecting terminal tabs are bent prior to stacking the memory frames. Threaded alignment pins or bolts are inserted through the holes in the memory frame corners to hold the stacked array in a tightly held package, to maintain the inter-plane connections. The previously bent terminal tabs are dip soldered, welded, or the like to provide a secure connection. When dip-soldering techniques are used, an entire side of a stacked array may be gang soldered.

It is understood that suitable modifications may be made in the method as disclosed provided that such modifications come within the spirit and scope of the appended claims. Having now, therefore, fully illustrated and described my invention, what I claim to be new and desire to protect by Letters Patent is set forth in the appended claims.

We claim:

1. A method of manufacturing an extended tab core memory matrix comprising the steps of:
(a) forming an insulation spacer member;
(b) forming a conductive sheet member;
(c) forming an overhang of said sheet member over said spacer member;
(d) laminating said sheet member to said spacer member;
(e) cleansing said sheet member;
(f) selectively photo-etching said sheet member to provide individual extended terminal tabs that overhang said spacer member.

2. A method of manufacturing an extended tab core memory matrix comprising the steps of:
(a) forming an insulation spacer member into a rectangular configuration with an opening centrally disposed therein;
(b) forming conductive sheet members into a rectangular configuration having large dimensions than those of said spacer member;
(c) forming an overhang of said sheet members over said spacer member in said larger dimensions;
(d) laminating said conductive sheet members to respective planar surfaces of said spacer member to form a composite assembly;
(e) coating an exposed planar surface of the conductive sheet members with a photo-sensitive resist material;
(f) masking said photo-sensitive resist material with a masking means having a predetermined pattern of opaque and open areas;
(g) exposing said photo-sensitive resist material to light energy to form predetermined areas of light hardened resist material;

(h) developing said resist material in a developing solution;
(i) applying a dye material to said photo-sensitive resist material for providing a visual indication in predetermined areas of said resist of pattern resolution;
(j) etching predetermined areas of said photo-sensitive resist material to form individual conductive terminal portions on said spacer member having extending tabs projecting beyond the edges of the spacer member;
(k) cleansing said tabs to expose conductive surfaces of said tabs that overhang said spacer member.

3. The method of claim 2 wherein said insulation spacer member is an epoxy-glass-laminate.

4. The method of claim 3 wherein said conductive sheet members are copper.

5. A method for manufacturing an extended tab core memory frame comprising the steps of:
(a) applying an adhesive to one planar surface of two conductive sheet members;
(b) laminating the conductive sheet members to lateral surfaces of insulation spacer member having a centrally disposed opening to form a composite assembly, said conductive sheet members extending beyond the spacer member in an overhanging manner;
(c) selectively printing, developing, and etching said overhanging conductive sheet members to form individual extend tab terminations on said spacer member that overhang said spacer member.

6. A method for manufacturing an extended tab core memory frame comprising the steps of:
(a) preparing an insulation spacer frame member into a rectangular configuration of predetermined size dimensions to contain a centrally disposed opening;
(b) preparing substantially rectangular conductive sheet members into larger size dimensions than those of said spacer members;
(c) applying an adhesive coating to one entire planar surface of said conductive sheet members treated with an oxide coating;
(d) drying said coated sheet members;
(e) assembling said conductive sheet members with said spacer member to form a composite assembly, the adhesive planar surface of said sheet members mating with planar surfaces of said spacer member;
(f) laminating said composite assembly;
(g) cleansing said composite assembly and applying a protective coating;
(h) drying said composite assembly;
(i) applying a photo-sensitive resist material to the entire unmated planar surfaces of said conductive sheet members;
(j) masking said photo-sensitive resist material with a masking means having a predetermined pattern of open and opaque areas;
(k) exposing said photo-sensitive resist material under the open areas of the mask to light energy;
(l) developing said resist material in a developing solution to remove unexposed resist;
(m) applying a dye solution for absorption into the exposed resist material to permit a visual indication of the exposed areas of the resist material;
(n) cleansing said composite assembly to remove unabsorbed dye;
(o) drying said composite assembly;
(p) etching said conductive sheet members with an etchant to remove conductive material corresponding to the unexposed areas to provide a composite assembly with individual extended tabs of said sheet member that overhang said spacer member;
(q) stripping the remaining exposed photo-sensitive resist material with a stripping agent, then cleansing and drying the composite assembly;
(r) fabricating holes in predetermined locations through the spacer member;

(s) cleansing said composite assembly to remove remaining adhesive coating;

(t) drying said composite assembly;

(u) cleansing the remaining conductive material of said sheet members again;

(v) applying a protective conductive coating to said remaining conductive material;

(w) cleansing said remaining conductive material;

(x) and drying said composite assembly.

7. The method of claim 6 for fabricating a plurality of composite assemblies, then bending said tabs, and stacking a plurality of said memory frames in a superimposed relationship after stringing said cores, and securedly interconnecting said frames in the stack by dip-soldering said bent extended tabs.

8. A method for manufacturing an extended tab core memory frame comprising the steps of:

(a) stacked assembly of a first conductive sheet member, an insulation spacer member having a centrally disposed opening, and a second conductive sheet member;

(b) arranging edges of the sheet members to extend beyond the terminal edges of the spacer member in a cantilevered configuration;

(c) adhesively laminating said stacked assembly;

(d) removing selected portions of the sheet members to form individual conductive terminals supported by said spacer member and extending beyond the edges thereof.

9. The method of claim 8 wherein the step of removing comprises a photo-etching process.

References Cited

UNITED STATES PATENTS

| | | | |
|---|---|---|---|
| 3,176,191 | 3/1965 | Rowe | 29—626 X |
| 2,961,746 | 11/1960 | Lyman | 29—625 |
| 3,017,615 | 1/1962 | Smith et al. | 29—604 |
| 3,126,526 | 3/1964 | Wood | 29—604 |
| 3,177,103 | 4/1965 | Tally et al. | 29—625 X |
| 3,178,802 | 4/1965 | Foreman | 29—604 |
| 3,196,416 | 7/1965 | Williams | 340—174 |
| 3,311,966 | 4/1967 | Shaheen | 29—625 |

JOHN F. CAMPBELL, *Primary Examiner.*

D. C. REILEY, *Assistant Examiner.*

UNITED STATES PATENT OFFICE

CERTIFICATE OF CORRECTION

Patent No. 3,382,572 May 14, 1968

Carl T. Crawford et al.

It is certified that error appears in the above identified patent and that said Letters Patent are hereby corrected as shown below:

Column 7, line 60, "large" should read -- larger --. Column 9, line 18, before "stacked" insert -- forming a --.

Signed and sealed this 7th day of October 1969.

(SEAL)
Attest:

Edward M. Fletcher, Jr.
Attesting Officer

WILLIAM E. SCHUYLER, JR.
Commissioner of Patents